US012591527B2

(12) United States Patent
Adler et al.

(10) Patent No.:    US 12,591,527 B2
(45) Date of Patent:    Mar. 31, 2026

(54) INTEGRATED CIRCUIT GENERATION WITH IMPROVED INTERCONNECT

(71) Applicant: SiFive, Inc., Santa Clara, CA (US)

(72) Inventors: Robert P. Adler, Santa Clara, CA (US);
David Parry, San Mateo, CA (US);
Rick H. Y. Chen, San Mateo, CA (US);
Henry Cook, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/747,410

(22) Filed: Jun. 18, 2024

(65) Prior Publication Data

US 2024/0338329 A1    Oct. 10, 2024

Related U.S. Application Data

(63) Continuation of application No. PCT/US2022/051122, filed on Nov. 29, 2022.

(60) Provisional application No. 63/292,882, filed on Dec. 22, 2021.

(51) Int. Cl.
*G06F 115/02*      (2020.01)
*G06F 12/0888*      (2016.01)
*G06F 13/16*      (2006.01)

(52) U.S. Cl.
CPC ...... *G06F 13/1668* (2013.01); *G06F 12/0888* (2013.01); *G06F 2212/603* (2013.01)

(58) Field of Classification Search
None
See application file for complete search history.

(56) References Cited

U.S. PATENT DOCUMENTS

| | | | | |
|---|---|---|---|---|
| 5,136,691 A | * | 8/1992 | Baror | G06F 12/0888 |
| | | | | 711/E12.036 |
| 5,761,719 A | * | 6/1998 | Mahin | G06F 12/0888 |
| | | | | 711/138 |
| 6,757,708 B1 | * | 6/2004 | Craig | G06F 16/9574 |
| | | | | 719/311 |
| 2002/0188889 A1 | * | 12/2002 | Phan | G06F 11/3409 |
| | | | | 712/216 |
| 2003/0061278 A1 | * | 3/2003 | Agarwalla | H04L 67/564 |
| | | | | 709/219 |

(Continued)

OTHER PUBLICATIONS

Cook et al., "Diplomatic Design Patterns: A TileLink Case Study", Oct. 2017 (Year: 2017).*

(Continued)

*Primary Examiner* — Hyun Nam
(74) *Attorney, Agent, or Firm* — Kilpatrick Townsend & Stockton LLP

(57)    ABSTRACT

Disclosed are systems and methods that include accessing design parameters to configure an integrated circuit design. The integrated circuit design may include a transaction source or processing node to be included in an integrated circuit. The transaction source or processing node may be configured to transmit memory transactions to memory addresses. A compiler may compile the integrated circuit design with the transaction source or processing node to generate a design output. The design output may be configured to route memory transactions based on their targeting cacheable or non-cacheable memory addresses. The design output may be used to manufacture an integrated circuit.

19 Claims, 7 Drawing Sheets

(56) References Cited

U.S. PATENT DOCUMENTS

| | | | |
|---|---|---|---|
| 2007/0050553 A1 | 3/2007 | Hsu et al. | |
| 2013/0185475 A1* | 7/2013 | Talagala .............. | G06F 12/0866 |
| | | | 711/102 |
| 2013/0185488 A1* | 7/2013 | Talagala .............. | G06F 12/0888 |
| | | | 711/103 |
| 2014/0047193 A1* | 2/2014 | Gross ................. | G06F 11/0793 |
| | | | 711/144 |
| 2017/0300415 A1 | 10/2017 | Bonen et al. | |
| 2021/0303196 A1* | 9/2021 | Lv ......................... | G06F 3/0679 |
| 2022/0114112 A1* | 4/2022 | Deutsch .............. | G06F 12/1466 |
| 2022/0207644 A1* | 6/2022 | Korobkov ........... | H04N 19/423 |
| 2024/0134796 A1* | 4/2024 | Pei ...................... | G06F 12/0888 |
| 2024/0338329 A1* | 10/2024 | Adler ...................... | G06F 30/32 |
| 2024/0411970 A1* | 12/2024 | Chen .................... | G06F 30/323 |

OTHER PUBLICATIONS

Cook et al., "Diplomatic Design Patterns: A TileLink Case Study",
Proceedings of First Workshop on Computer Architecture Research
with RISC-V, Oct. 2017, 7 pages.
PCT/US2022/051122 , "International Preliminary Report on Patentability", Jul. 4, 2024, 13 pages.
PCT/US2022/051122 , "International Search Report and Written
Opinion", Apr. 13, 2023, 16 pages.

* cited by examiner

300

302

ACCESS A DESIGN PARAMETERS DATA STRUCTURE TO
CONFIGURE AN INTEGRATED CIRCUIT DESIGN

304

ACCESS METADATA ASSOCIATED WITH THE INTEGRATED
CIRCUIT DESIGN

306

COMPILE THE INTEGRATED CIRCUIT DESIGN TO GENERATE
A DESIGN OUTPUT WITH IMPROVED INTERCONNECT

308

STORE AND/OR TRANSMIT THE DESIGN OUTPUT

INTEGRATED CIRCUIT GENERATION WITH IMPROVED INTERCONNECT

CROSS-REFERENCES TO RELATED APPLICATIONS

This application is a continuation of International Application No. PCT/US2022/051122, filed Nov. 29, 2022, which claims priority to U.S. Provisional Application No. 63/292,882, filed Dec. 22, 2021, the entire contents of which are incorporated herein by references for all purposes.

FIELD OF TECHNOLOGY

This disclosure relates generally to integrated circuits, and more specifically, to integrated circuit generation with improved interconnect.

BACKGROUND

Integrated circuits may be designed and tested in a multi-step process that involves multiple specialized engineers performing a variety of different design and verification tasks on an integrated circuit design. A variety of internal or proprietary (e.g., company-specific) integrated circuit design tool chains may be used by these engineers to handle different parts of the integrated circuit design workflow of using commercial electronic design automation (EDA) tools.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
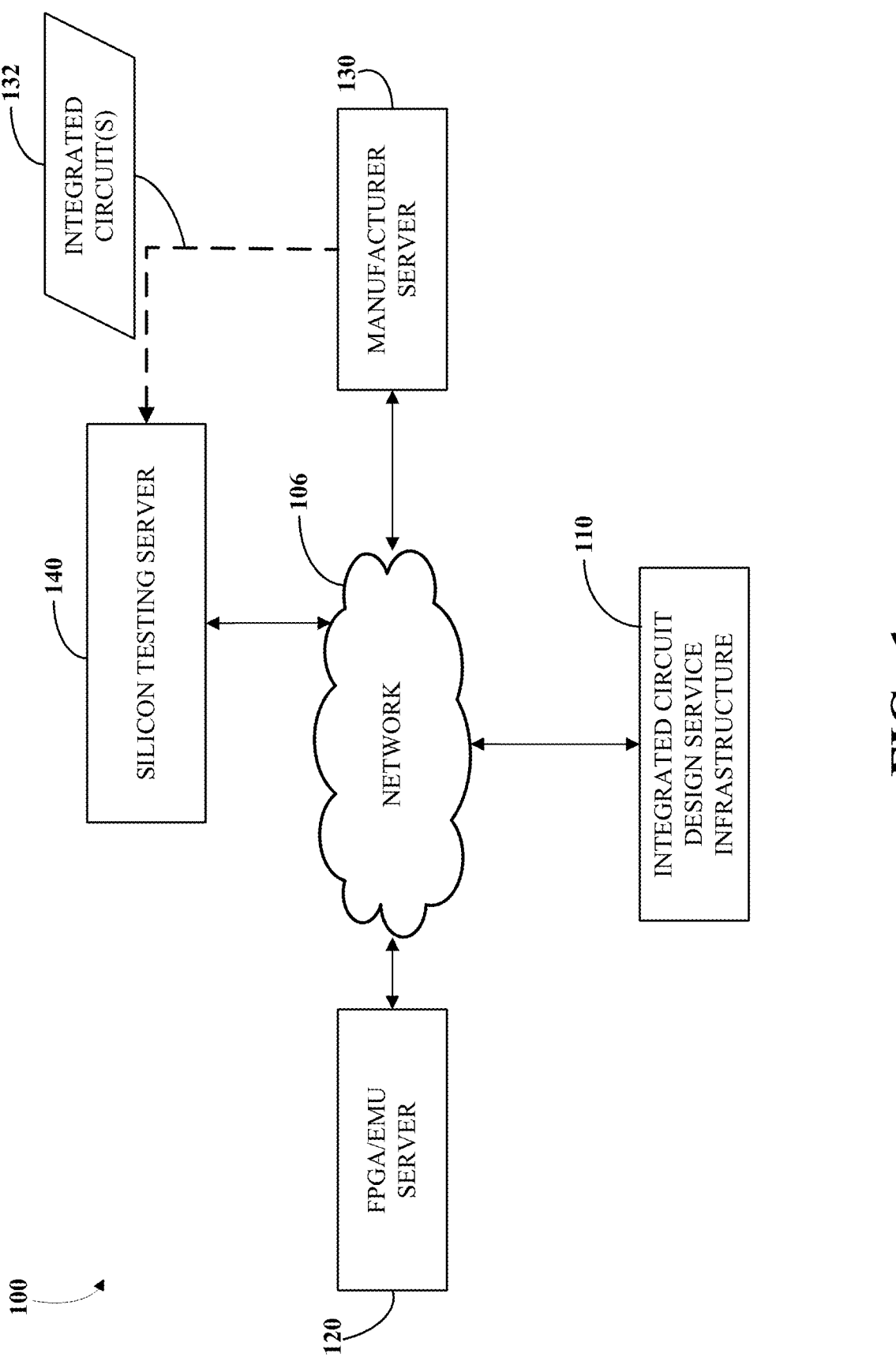
FIG. 1 is a block diagram of an example of a system for facilitating generation and manufacture of integrated circuits.

In a computing system, a processor core may transmit memory transactions relating to storage of data (e.g., read and/or write requests). Certain of these memory transactions may be cacheable in a cache, such as a private Level 2 (L2) cache associated with the core and/or a shared Level 3 (L3) cache associated with multiple cores. In some situations, a performance bottleneck may occur with the memory transactions sent to or through a cache, such as when multiple requests are sent close in time. For example, a cache may have a certain capacity to process and/or forward memory transactions, and a number of memory transactions may exceed that capacity. Thus, it may be desirable to implement a system that alleviates a performance bottleneck associated with the cache.

Described herein are techniques that may alleviate a performance bottleneck associated with accessing a cache, such as a private L2 cache. In some implementations, an integrated circuit generator may access design parameters to configure an integrated circuit design and may access metadata associated with the integrated circuit design. The integrated circuit design may include a transaction source (e.g., a processor core or a direct memory access (DMA) controller) to be included in an integrated circuit, such as an application-specific integrated circuit (ASIC) or a system on a chip (SoC). The transaction source may be configured to transmit multiple memory transactions to memory addresses (e.g., read and/or write requests), such as to cacheable memory addresses (e.g., addresses cacheable in the private L2 cache) and/or non-cacheable memory addresses (e.g., addresses associated with memory-mapped I/O (input/output), which are not cacheable in the private L2 cache). The integrated circuit generator may reference the metadata which may indicate whether a memory transaction will target a cacheable memory address or a non-cacheable memory address. The integrated circuit design and the metadata may be propagated to a compiler to compile the integrated circuit design (using the metadata) to generate a design output (e.g., a register transfer level (RTL) data structure, such as Verilog). The design output may express the design as synthesizable circuitry. In the design output, a memory transaction that targets a non-cacheable memory address may be routed to bypass a cache associated with the transaction source when the metadata indicates the memory transaction will target a non-cacheable memory address.

In some implementations, a transaction router (e.g., an address decoder) may be included in the design to provide a relatively early decode of addresses associated with memory transactions from the transaction source. The transaction router may be implemented in the integrated circuit to route memory transactions to cacheable memory addresses or non-cacheable memory addresses. Accordingly, by using the metadata, the integrated circuit design may be optimized to reduce circuitry associated with the integrated circuit (and therefore reduce the size of the integrated circuit), such as by reducing resources of the cache based on a reduction of a number of memory transactions to be supported by the cache. For example, the metadata may enable reducing circuitry at downstream units used to track request sources (e.g., a downstream unit that only sends data to the cache could have reduced circuitry).

Also described herein are techniques that may alleviate a performance bottleneck associated with accessing a cache, such as a shared L3 cache. In some implementations, a system may access design parameters to configure an integrated circuit design. The integrated circuit design may include one or more clusters of processing nodes (with a processing node including a transaction source, such as a processor core or a DMA controller, and a private L2 cache) to be included in an integrated circuit, such as an ASIC or an SoC. A processing node may be configured to transmit multiple memory transactions to memory addresses (e.g., read and/or write requests), such as to cacheable memory addresses (e.g., addresses cacheable in the shared L3 cache) and/or non-cacheable memory addresses (e.g., addresses associated with memory-mapped I/O, which are not cacheable in the shared L3 cache). The integrated circuit design may be compiled by a compiler to generate a design output (e.g., a register transfer level (RTL) data structure, such as Verilog). The design output may express the design as synthesizable circuitry. The design output may include a first transaction router (e.g., first address decoder) and a second transaction router (e.g., second address decoder). The first transaction router may receive memory transactions from the processing nodes. The first transaction router may determine whether a received memory transaction is targeting a cacheable memory address or a non-cacheable memory address. Accordingly, the first transaction router may provide a relatively early decode of addresses associated with memory transactions from the processing nodes. This may provide a performance benefit for the integrated circuit by separating possibly lower performance memory transactions targeting non-cacheable memory addresses (e.g., addresses associated with memory-mapped I/O) from possibly higher performance memory transactions targeting cacheable memory addresses (e.g., addresses associated with the cache). This may also provide a performance benefit for the integrated circuit by preventing possibly lower performance memory transactions targeting non-cacheable memory addresses (e.g., the addresses associated with memory-mapped I/O) from blocking possibly higher performance memory transactions targeting cacheable memory addresses (e.g., the addresses associated with the cache).

The second transaction router may receive memory transactions targeting cacheable memory addresses from the first transaction router. The second transaction router may determine a block of cacheable memory addresses (e.g., a bank of cache) to route a memory transaction to cache. Accordingly, the second transaction router may provide a further relatively early decode of addresses to determine an interface to route the transactions to cache. The transaction router(s) may permit reduced circuitry associated with the integrated circuit (and therefore a reduced size of the integrated circuit) by reducing and/or shortening wires associated with routing memory transactions to cache (e.g., an improved physical design). In some implementations, the second transaction router may include cache bank binding (e.g., address decoding associated with a cache bank) to permit a further reduction of wiring between the processing nodes and the cache. For example, in a system with eight processing nodes and eight blocks of cacheable memory addresses (e.g., eight banks), the second transaction router may include cache bank binding to reduce sixty-four possible buses (e.g., a bus between each processing node and each bank) to sixteen buses.

In some implementations, a third transaction router may receive memory transactions targeting non-cacheable memory addresses from the first transaction router. The third transaction router may route memory transactions through an interface associated with memory-mapped I/O addresses. In some implementations, metadata associated with the integrated circuit design may be propagated to the compiler to compile the integrated circuit design to generate the design output including the transaction router(s). For example, using the metadata may permit optimizing a processing node.

FIG. 1 is a block diagram of an example of a system 100 for generation and manufacture of integrated circuits having improved interconnect. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may provide metadata associated with the integrated circuit design. In some implementations, the integrated circuit design service infrastructure 110 may be configured to generate an integrated circuit design like the integrated circuit design 400 shown in FIG. 4, the integrated circuit design 500 shown in FIG. 5, the integrated circuit design 600 shown in FIG. 6, and/or the integrated circuit design 700 shown in FIG. 7.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel (available at https.//people.eecs-.berkeley.edu/~jrb/papers/chisel-dac-2012-corrected.pdf). For example, the RTL service module may be implemented using FIRRTL (flexible intermediate representation for register-transfer level) (available at https://aspire.eecs-.berkeley.edu/wp/wp-content/uploads/2017/11/Specifica-tion-for-the-FIRRTL-Language-Izraelevitz.pdf). For example, the RTL service module may be implemented using Diplomacy (available at https://carrv.github.io/2017/papers/cook-diplomacy-carrv2017.pdf). For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132, which may be structured based on a design output determined using the process 300 of FIG. 3.

Figure 2:
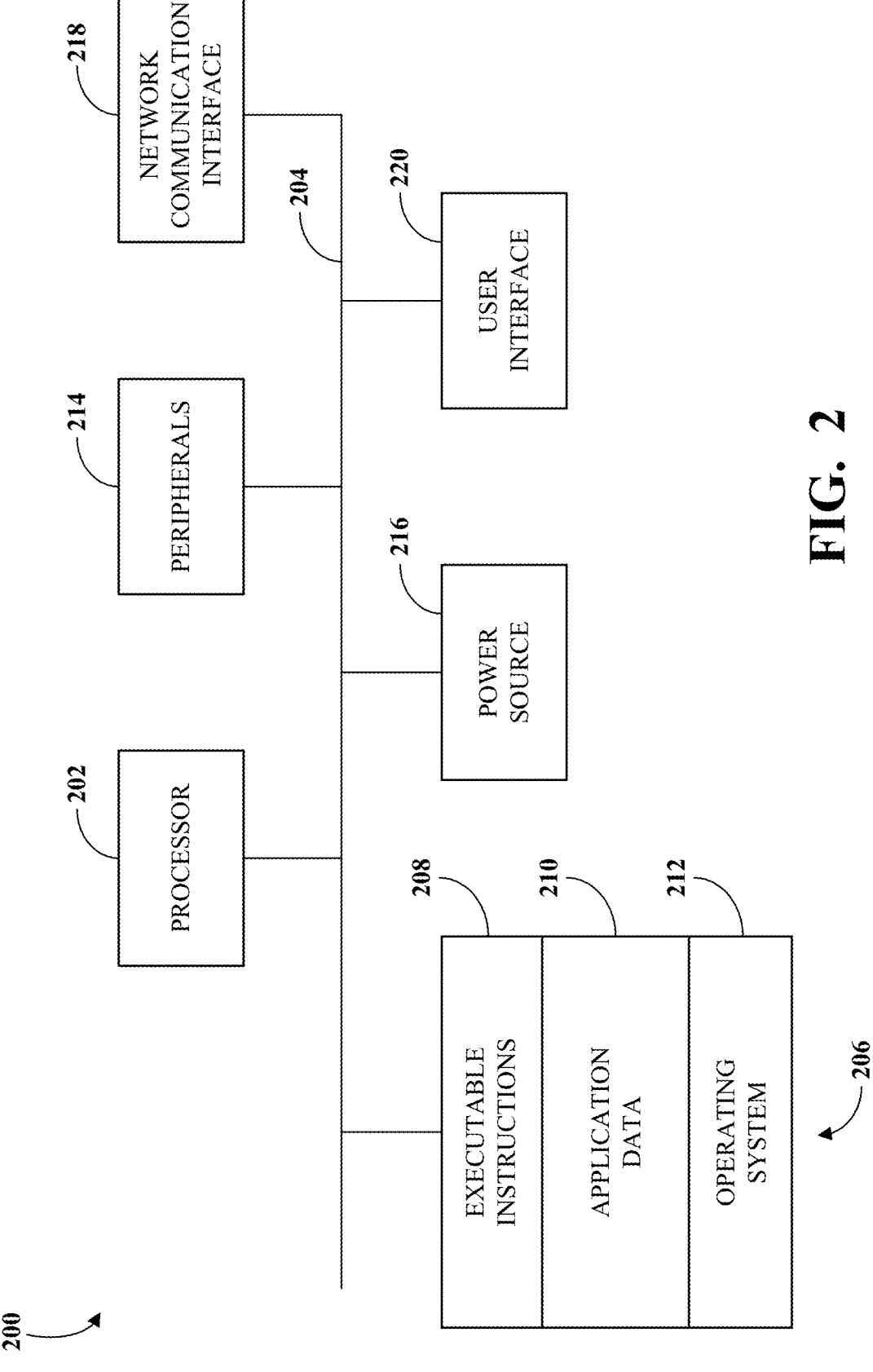
FIG. 2 is a block diagram of an example of a system for facilitating generation of integrated circuits.

FIG. 2 is a block diagram of an example of a system 200 for facilitating generation of integrated circuits having improved interconnect, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design 400 shown in FIG. 4, the integrated circuit design 500 shown in FIG. 5, the integrated circuit design 600 shown in FIG. 6, and/or the integrated circuit design 700 shown in FIG. 7. The system 200 can include components or units, such as a processor 202, a bus 204, a memory 206, peripherals 214, a power source 216, a network communication interface 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
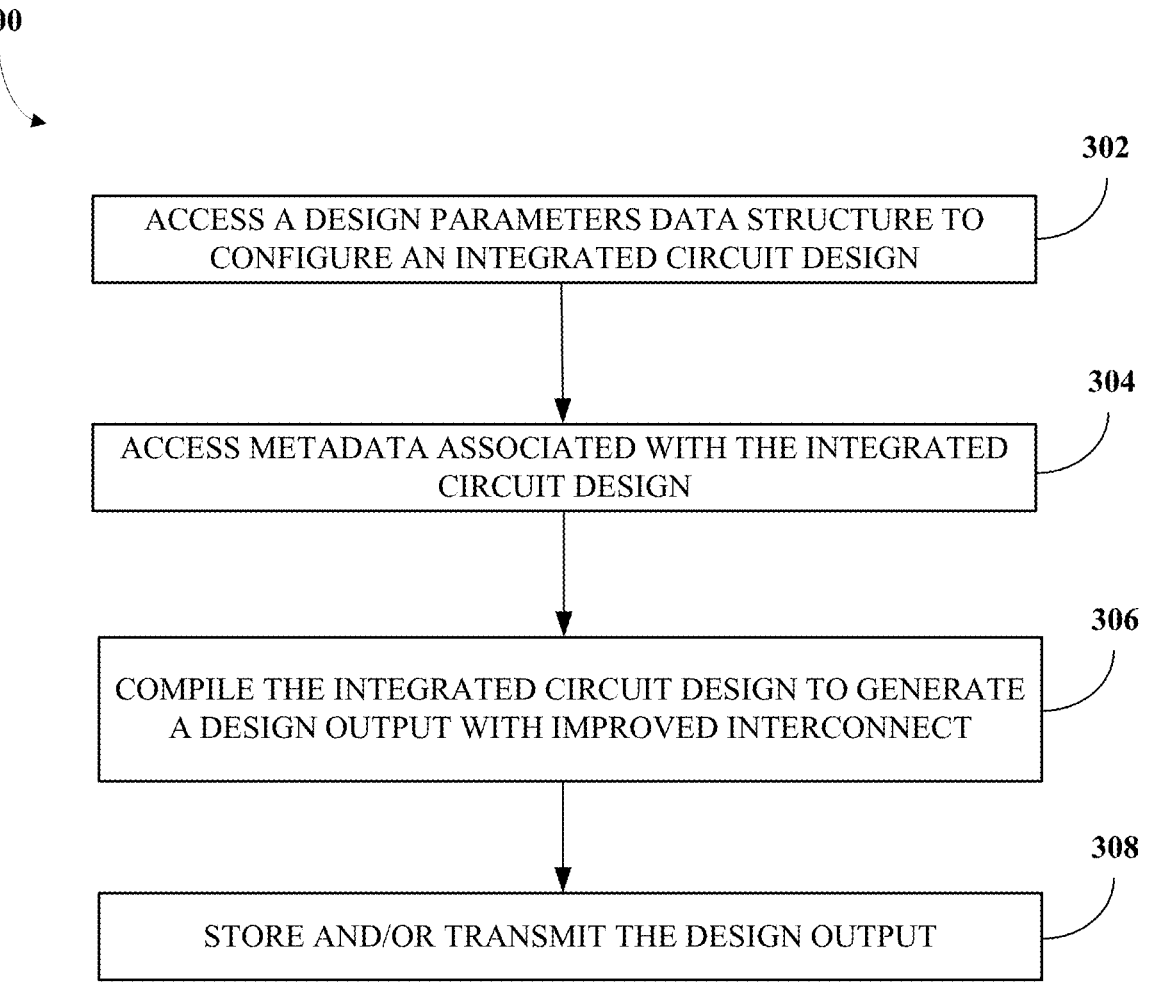
FIG. 3 is a flow chart of an example of a process for facilitating integrated circuit generation with improved interconnect.

FIG. 3 is a flow chart of an example of a process 300 for facilitating integrated circuit generation with improved interconnect. The process 300 may include accessing 302 a design parameters data structure to configure an integrated circuit design; accessing 304 metadata associated with the integrated circuit design; compiling 306 the integrated circuit design to generate a design output; and/or storing and/or transmitting 308 the integrated circuit design. For example, the process 300 may be implemented using the system 100 shown in FIG. 1 and/or the system 200 shown in FIG. 2. For example, the process 300 may be implemented, at least in part, to generate the integrated circuit design 400 shown in FIG. 4, the integrated circuit design 500 shown in FIG. 5, the integrated circuit design 600 shown in FIG. 6, and/or the integrated circuit design 700 shown in FIG. 7.

The process 300 may include accessing 302 a design parameters data structure to configure an integrated circuit design. For example, the integrated circuit design service infrastructure 110 shown in FIG. 1 could have the design parameters data structure stored as a first JSON file. For example, configuring the integrated circuit design could include executing Scala code to read the design parameters data structure and dynamically generate a circuit graph. In some implementations, configuring the integrated circuit design could include invoking a Diplomacy package in Chisel to determine a bus protocol for the integrated circuit.

The integrated circuit design may be propagated to a compiler to compile the integrated circuit design to generate a design output. The design output may be used to build an integrated circuit, such as an ASIC or an SoC.

In some implementations, the integrated circuit design may include a transaction source (e.g., a processor core or a DMA controller) to be included in the integrated circuit. The transaction source may be configured to transmit multiple memory transactions to memory addresses (e.g., read and/or write requests), such as to cacheable memory addresses (e.g., addresses cacheable in a private L2 cache) and/or non-cacheable memory addresses (e.g., addresses associated with memory-mapped I/O, which are not cacheable in a private L2 cache). In some implementations, the integrated circuit design may include one or more transaction routers (e.g., address decoders). For example, a transaction router may be implemented in the integrated circuit to route memory transactions to cacheable memory addresses and/or non-cacheable memory addresses.

In some implementations, the integrated circuit design may include one or more clusters of processing nodes (with a processing node including a transaction source, such as a processor core or a DMA controller, and a private L2 cache) to be included in the integrated circuit. A processing node may be configured to transmit multiple memory transactions to memory addresses (e.g., read and/or write requests), such as to cacheable memory addresses (e.g., addresses cacheable in the shared L3 cache) and/or non-cacheable memory addresses (e.g., addresses associated with memory-mapped I/O, which are not cacheable in the shared L3 cache).

The process 300 may also include accessing 304 metadata associated with the integrated circuit design. For example, the integrated circuit design service infrastructure 110 shown in FIG. 1 could have the metadata stored as a second JSON file. For example, configuring the integrated circuit design by executing the Scala code and/or by invoking the Diplomacy package in Chisel may produce metadata associated with the integrated circuit design. The metadata may include information used by the software to construct the hardware associated with the design. In some implementations, the metadata may indicate whether a memory transaction (e.g., transmitted by a transaction source) will target a cacheable memory address or a non-cacheable memory address. In some implementations, the metadata may permit optimizing a processing node. In some implementations, the metadata may be propagated to the compiler, with the integrated circuit design, to compile the integrated circuit design to generate the design output.

The process 300 may also include compiling 306 the integrated circuit design to generate the design output. For example, the integrated circuit design may be compiled to generate an RTL data structure such as Verilog. The design output may express the integrated circuit design as synthesizable circuitry. In some implementations, the integrated circuit design may be compiled with the metadata associated with the integrated circuit design to generate the design output. For example, the design output may be implemented using FIRRTL. For example, the design output may be implemented using Diplomacy. For example, the design output may enable a well-designed chip to be automatically developed from a high level set of configuration settings using a mix of Diplomacy, Chisel, and FIRRTL. For example, a compiler may take the design parameters data structure (e.g., a first JSON file) as input, and in some implementations, may take the metadata (e.g., generated by the integrated circuit generator, such as by executing the Scala code and/or by invoking the Diplomacy package in Chisel, and/or from a second JSON file) as input, and generate the design output.

In some implementations, the design output may include a transaction router (e.g., an address decoder) to provide a relatively early decode of addresses associated with memory transactions from the transaction source. The transaction router may be implemented in the integrated circuit to route memory transactions to cacheable memory addresses or non-cacheable memory addresses. In some implementations, in the design output, a memory transaction that targets a non-cacheable memory address may be routed to bypass a cache associated with the transaction source when the metadata indicates the memory transaction will target a non-cacheable memory address.

In some implementations, the design output may include a first transaction router (e.g., first address decoder) and a second transaction router (e.g., second address decoder). The first transaction router may receive memory transactions from the processing nodes. The first transaction router may determine whether a received memory transaction is targeting a cacheable memory address or a non-cacheable memory address. The second transaction router may receive memory transactions targeting cacheable memory addresses from the first transaction router. The second transaction router may determine a block of cacheable memory addresses (e.g., a bank of cache) to route a memory transaction to cache. In some implementations, the second transaction router may include cache bank binding (e.g., address decoding associated with a cache bank) to permit a further reduction of wiring between the processing nodes and the cache. In some implementations, a third transaction router may receive memory transactions targeting non-cacheable memory addresses from the first transaction router. The third transaction router may route memory transactions through an interface associated with memory-mapped I/O addresses.

The process 300 may also include storing and/or transmitting 308 the design output compiled from the integrated circuit design (and in some implementations, from the metadata associated with the integrated circuit design). The design output may be stored for use in subsequent operations, such as synthesis, placement and routing, implementation of clock trees, and/or simulation analysis. Additionally, the design output may be transmitted for manufacturing of an integrated circuit, such as an ASIC or an SoC.

Figure 4:
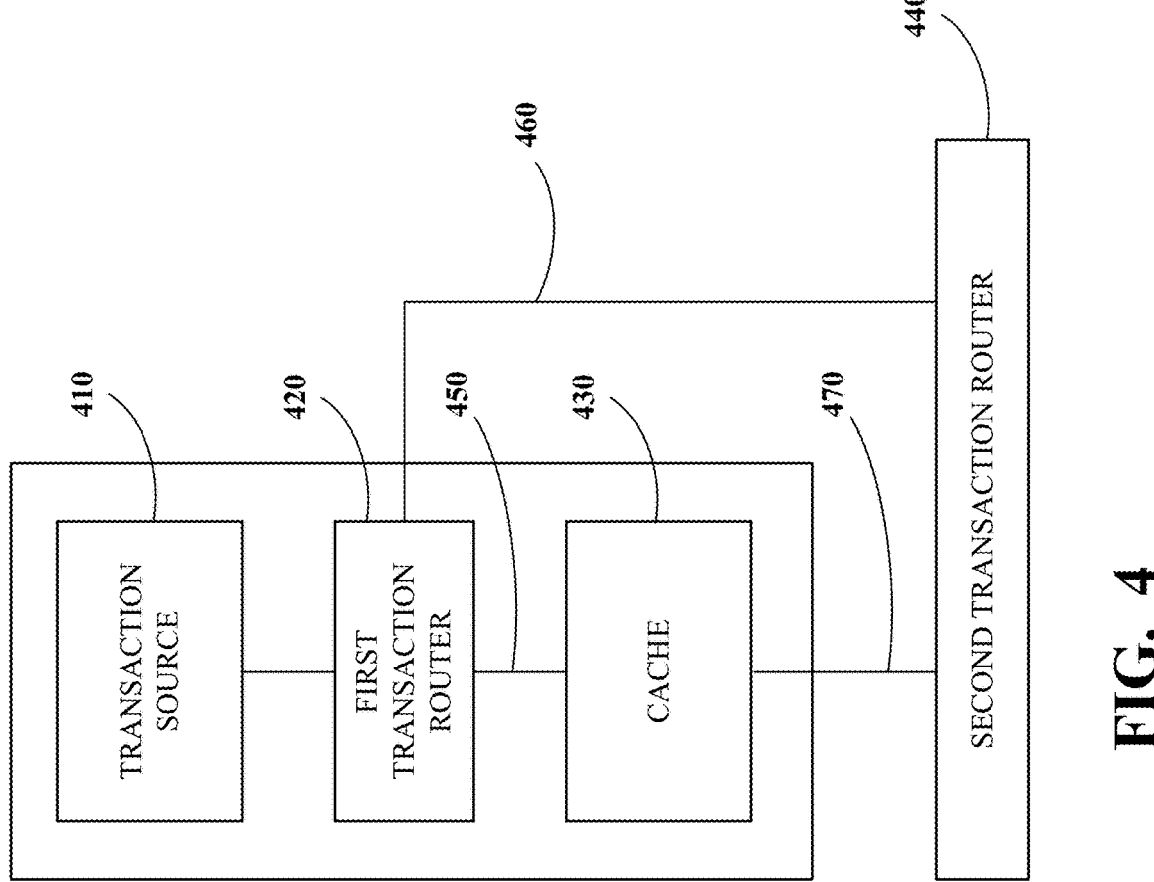
FIG. 4 is a block diagram of an example of an integrated circuit design with improved interconnect.

FIG. 4 is a block diagram of an example of an integrated circuit design 400 with improved interconnect. For example, the integrated circuit design 400 may be generated using at least part of the process 300 shown in FIG. 3. A system, such as the integrated circuit design service infrastructure 110 shown in FIG. 1, may access design parameters to configure the integrated circuit design 400. The integrated circuit design 400 may be configured to include a transaction source 410; a first transaction router 420 (e.g., a first address decoder); a cache 430; and/or a second transaction router 440 (e.g., a second address decoder). In some implementations, the integrated circuit design 400 may be a processing node, the transaction source 410 may be a processor core or a DMA controller, and/or the cache 430 may be a private L2 cache associated with the transaction source 410.

The transaction source 410 may be configured to transmit multiple memory transactions to memory addresses (e.g., read and/or write requests). The memory transactions may target cacheable memory addresses (e.g., addresses cacheable in the cache 430) and/or non-cacheable memory addresses (e.g., addresses associated with memory-mapped I/O, which are not cacheable in the cache 430). The first transaction router 420 may be connected to the transaction source 410 to receive memory transactions from the transaction source 410. The first transaction router 420 may provide a relatively early decode of addresses associated with the memory transactions from the transaction source 410. Based on metadata associated with the integrated circuit design, and more particularly, metadata associated with the transaction source 410, the integrated circuit design may be compiled to generate a design output that optimizes routing of the memory transactions from the transaction source 410. For example, the design output may configure the first transaction router 420 to route memory transactions targeting cacheable memory addresses to the cache 430 (in a cache path 450) when metadata indicates the transaction source 410 will target cacheable memory addresses (e.g., the metadata indicates cacheability of at least one memory address associated with the first transaction router 420). The design output may configure the first transaction router 420 to route memory transactions targeting non-cacheable memory addresses to the second transaction router 440 (in a non-cache path 460 that bypasses the cache 430) when metadata indicates the transaction source 410 will target non-cacheable memory addresses. Additionally, memory transactions routed to the cache 430 may be routed through the cache 430 to the second transaction router 440 (e.g., in a read/write through path 470), such as when reading and/or writing to a higher level of cache, such as an L3 cache.

Accordingly, by using the metadata, a design may be configured in which memory transactions targeting non-cacheable memory addresses, such as memory addresses corresponding to memory-mapped I/O, bypass the cache 430. This may permit the integrated circuit design to be optimized, such as by reducing resources of the cache 430 based on a reduction of a number of memory transactions to be supported by the cache 430. For example, a system may determine in advance whether an address is cacheable or non-cacheable (e.g., a physical memory attribute).

In some implementations, the integrated circuit design 400 may be configured to include a third transaction router that is separate from the first transaction router 420 and the second transaction router 440. As before, the design output may configure the first transaction router 420 to route memory transactions targeting cacheable memory addresses to the cache 430 (in the cache path 450) when metadata indicates the transaction source 410 will target cacheable memory addresses (e.g., the metadata indicates cacheability of at least one memory address associated with the first transaction router 420). Memory transactions routed to the cache 430 may be routed through the cache 430 to the second transaction router 440 (e.g., in the read/write through path 470), such as when reading and/or writing to a higher level of cache, such as an L3 cache. With the third transaction router, the design output may configure the first transaction router 420 to route memory transactions targeting non-cacheable memory addresses to the third transaction router (in the non-cache path 460 that bypasses the cache 430 and the second transaction router 440) when metadata indicates the transaction source 410 will target non-cacheable memory addresses.

In some implementations, the metadata may indicate that the transaction source 410 will only send memory transactions to cacheable memory addresses. In this implementation, the design output may configure the first transaction router 420 to permanently route memory transactions from the transaction source 410 to the cache 430. In other words, the design output may delete the non-cache path 460 and associated circuitry.

In some implementations, the metadata may indicate that the transaction source 410 will only send memory transactions to non-cacheable memory addresses. In this implementation, the design output may configure the first transaction router 420 to permanently route memory transactions from the transaction source 410 to the second transaction router 440 (and permanently bypass the cache 430). In other words, the design output may delete the cache path 450 and associated circuitry.

Figure 5:
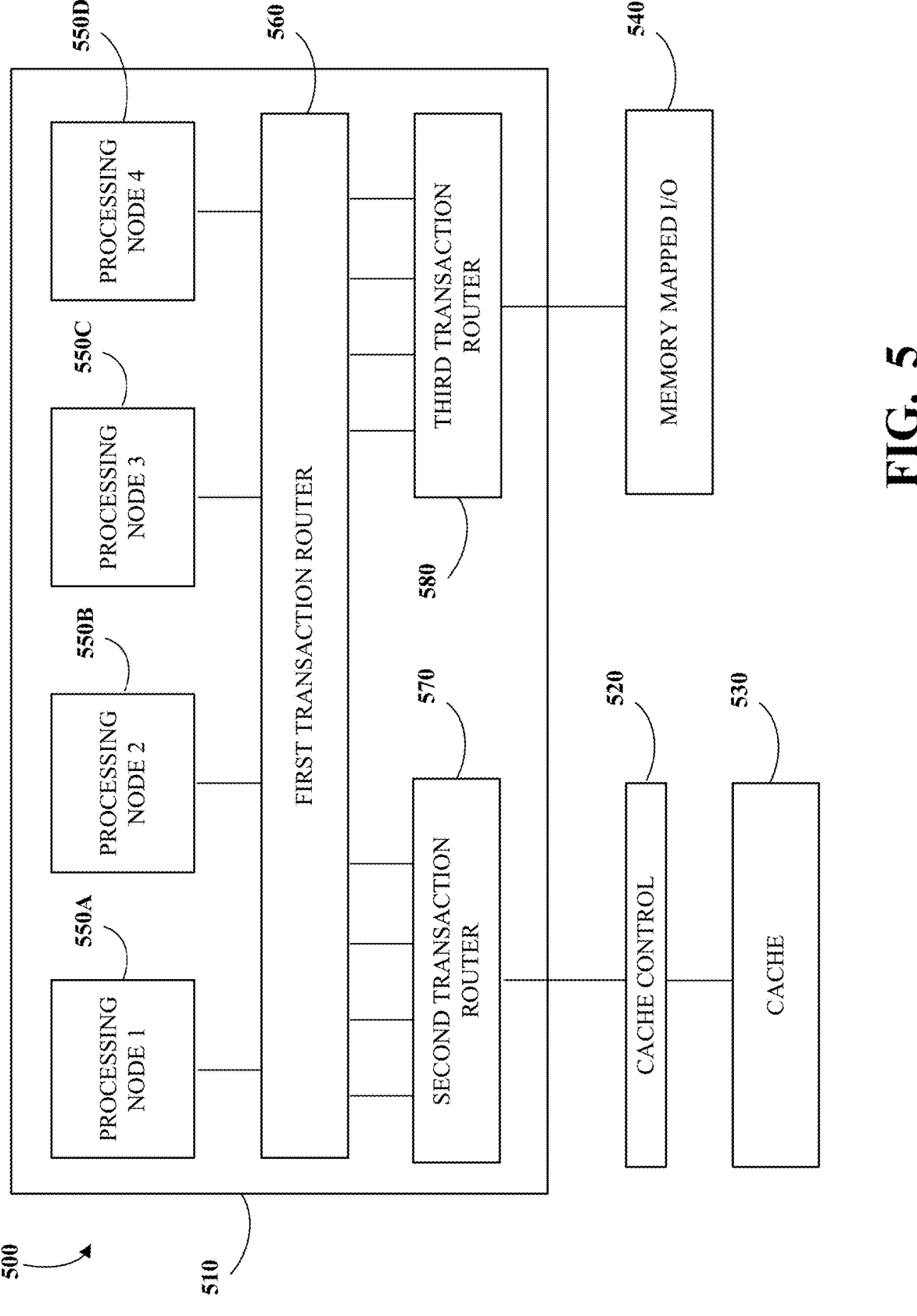
FIG. 5 is a block diagram of another example of an integrated circuit design with improved interconnect.

FIG. 5 is a block diagram of another example of an integrated circuit design 500 with improved interconnect. For example, the integrated circuit design 500 may be generated using at least part of the process 300 shown in FIG. 3. A system, such as the integrated circuit design service infrastructure 110 shown in FIG. 1, may access design parameters to configure the integrated circuit design 500. The integrated circuit design 500 may be configured to include a cluster 510; cache control circuitry 520; a cache 530; and/or memory-mapped I/O circuitry 540. The cluster 510 may include one or more processing nodes, such as processing nodes 550A through 550D; a first transaction router 560 (e.g., a first address decoder); a second transaction router 570 (e.g., a second address decoder); and/or a third transaction router 580 (e.g., a third address decoder). In some implementations, the transaction router(s) may comprise cross bar(s) and associated circuitry. In some implementations, the cache 530 may be an L3 cache shared by processing nodes of one or more clusters, such as the cluster 510.

A processing node may include a transaction source, such as a processor core or a DMA controller. In some implementations, a processing node may include a cache, such as a private L2 cache. For example, a processing node may comprise the transaction source 410, the first transaction router 420, and/or the cache 430 shown in FIG. 4. A processing node may be configured to transmit multiple memory transactions to memory addresses (e.g., read and/or write requests). The memory transactions may target cacheable memory addresses (e.g., addresses cacheable in the cache 530) and/or non-cacheable memory addresses (e.g., addresses associated with memory-mapped I/O, which are not cacheable in the cache 530).

The first transaction router 560 may be connected to the processing nodes to receive memory transactions from the processing nodes. For example, the first transaction router 560 may implement four bus interfaces to receive memory transactions from the four processing nodes (e.g., one bus per processing node). The integrated circuit design may be compiled to generate a design output that optimizes routing of the memory transactions from the processing nodes. For example, the design output may configure the first transaction router 560 to determine whether a memory transaction is targeting a cacheable memory address or a non-cacheable memory address. Accordingly, the first transaction router 560 may provide a relatively early decode of addresses associated with memory transactions from the processing nodes.

The first transaction router 560 may route memory transactions targeting cacheable memory addresses to the second transaction router 570, and/or may route memory transactions targeting non-cacheable memory addresses to the third transaction router 580. The first transaction router 560 may route the memory transactions to the one or more transaction routers via bus interfaces associated with the processing nodes. For example, the first transaction router 560 may implement four bus interfaces to route memory transactions targeting cacheable memory addresses to the second transaction router 570 (e.g., one bus corresponding to a processing node, dedicated to routing memory transactions targeting cacheable memory addresses). For example, the first transaction router 560 may implement four bus interfaces to route memory transactions targeting non-cacheable memory addresses to the third transaction router 580 (e.g., one bus corresponding to a processing node, dedicated to routing memory transactions targeting non-cacheable memory addresses). In other words, memory transactions that target cacheable memory addresses may be routed to the second transaction router 570, and memory transactions that target non-cacheable memory addresses may be routed to the third transaction router 580 (in a separate path that avoids the cache 530). This may permit the integrated circuit design to be optimized, such as by reducing resources of the cache 530 based on a reduction of a number of memory transactions to be supported by the cache 530. This may provide a performance benefit for the integrated circuit by separating possibly lower performance memory transactions targeting non-cacheable memory addresses (e.g., addresses associated with the memory-mapped I/O circuitry 540) from possibly higher performance memory transactions targeting cacheable memory addresses (e.g., addresses associated with the cache 530). This may also provide a performance benefit for the integrated circuit by preventing possibly lower performance memory transactions targeting non-cacheable memory addresses (e.g., addresses associated with the memory-mapped I/O circuitry 540) from blocking possibly higher performance memory transactions targeting cacheable memory addresses (e.g., addresses associated with the cache 530).

The second transaction router 570 may receive memory transactions targeting cacheable memory addresses from the first transaction router 560. For example, the second transaction router 570 may implement four bus interfaces to receive memory transactions targeting cacheable memory addresses propagating from the four processing nodes (e.g., one bus per processing node). The second transaction router 570 may route the memory transactions targeting cacheable memory addresses through a bus interface associated with cache addresses (e.g., to the cache control circuitry 520 and/or the cache 530.) In some implementations, the cache control circuitry 520 may comprise a system level cross bar and associated circuitry. In some implementations, the cache control circuitry 520 may provide cache coherency. In some implementations, the cache 530 may implement multiple physical banks.

The third transaction router 580 may receive memory transactions targeting non-cacheable memory addresses from the first transaction router 560. For example, the third transaction router 580 may implement four bus interfaces to receive memory transactions targeting non-cacheable memory addresses propagating from the four processing nodes (e.g., one bus per processing node). The third transaction router 580 may route memory transactions targeting non-cacheable memory addresses to the memory-mapped I/O circuitry 540.

In some implementations, the cluster 510 may be configured to provide two bus interfaces for memory transactions, including one bus for memory transactions targeting cacheable memory addresses and one bus for memory transactions targeting non-cacheable memory addresses. Accordingly, the integrated circuit design 500 may provide one or more transaction routers that permit reducing and/or shortening wires associated with routing memory transactions. This may result in an improved physical design of the chip, such as by reducing wiring, shortening wiring, and/or providing a smaller footprint, while maintaining bandwidth.

In some implementations, the third transaction router 580 may be omitted. For example, the first transaction router 560 could route memory transactions targeting non-cacheable memory addresses directly to the memory-mapped I/O circuitry 540. For example, in this implementation, the cluster 510 may be configured to provide five bus interfaces for memory transactions, including one bus for memory transactions targeting cacheable memory addresses, and four buses for memory transactions targeting non-cacheable memory addresses.

In some implementations, metadata associated with the integrated circuit design 500 may be propagated to the compiler to compile the integrated circuit design 500 to generate the design output. For example, using the metadata may permit optimizing a processing node, such as processing nodes 550A through 550D.

Figure 6:
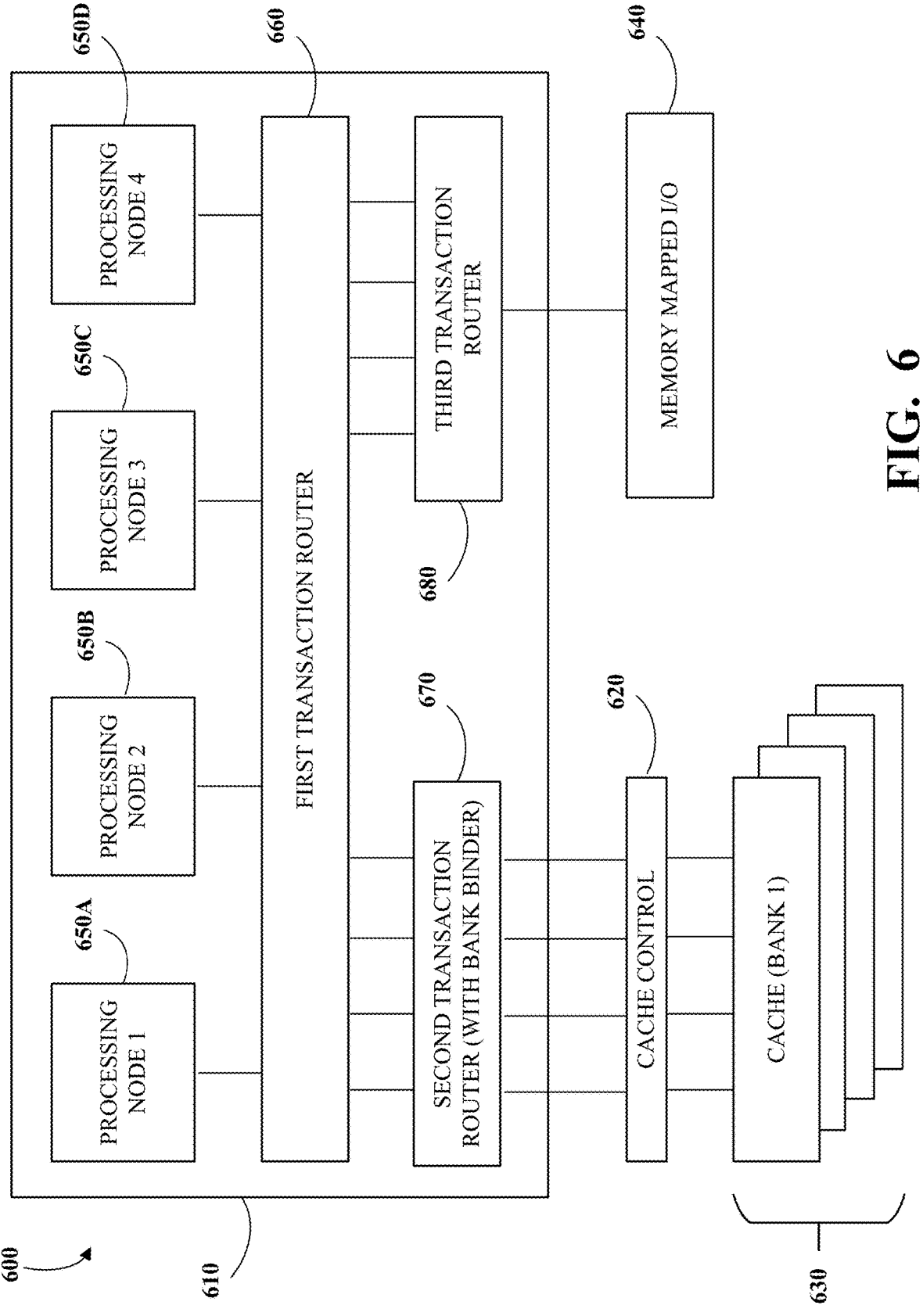
FIG. 6 is a block diagram of another example of an integrated circuit design with improved interconnect.

FIG. 6 is a block diagram of another example of an integrated circuit design 600 with improved interconnect. For example, the integrated circuit design 600 may be generated using at least part of the process 300 shown in FIG. 3. A system, such as the integrated circuit design service infrastructure 110 shown in FIG. 1, may access design parameters to configure the integrated circuit design 600. The integrated circuit design 600 may be configured to include a cluster 610 including processing nodes, a first transaction router 660, and a third transaction router 680 like, respectively, the processing nodes, the first transaction router 560, and the third transaction router 580 shown in FIG. 5. The integrated circuit design 600 may also include cache control circuitry 620 that routes transactions to banks, and a cache 630 that is segmented into multiple physical banks. The integrated circuit design 600 may also include a second transaction router 670 in the cluster 610, which implements bank binding for routing memory transactions to specific banks of the cache 630. In some implementations, the cache 630 may be an L3 cache shared by processing nodes of one or more clusters, such as the cluster 610. In some implementations, the number of banks of the cache 630 may equal the number of processing nodes (e.g., four banks implemented supporting four processing nodes in one cluster, eight banks supporting eight processing nodes, etc.). In some implementations, the cache control circuitry 620 may comprise a system level cross bar and associated circuitry. In some implementations, the cache control circuitry 620 may provide cache coherency.

The second transaction router 670 may receive memory transactions targeting cacheable memory addresses from the first transaction router 660. For example, the second transaction router 670 may implement four bus interfaces to receive memory transactions targeting cacheable memory addresses propagating from the four processing nodes (e.g., one bus per processing node). The second transaction router 670 may implement cache bank binding (e.g., a bank binder) to permit a further reduction of wiring between the processing nodes and the cache. The bank binding may permit the second transaction router 670 to route memory transactions in parallel, via multiple bus interfaces, to corresponding banks of the cache 630. In other words, the second transaction router 670 may provide a relatively early decode of addresses associated with a specific bank of cache. The second transaction router 670 may determine a block of cacheable memory addresses (e.g., a bank of the cache 630) to route a memory transaction. In some implementations, the second transaction router 670 may make this determination by performing a hash calculation that associates a cacheable memory address with a block of cacheable memory addresses (e.g., a bank of the cache 630). The second transaction router 670 then routes the memory transaction to the block of cacheable memory addresses (e.g., to the bank of the cache 630) via the cache control circuitry 620.

In some implementations, the cluster 610 may be configured to provide N+1 buses for memory transactions, where N indicates the number of buses for memory transactions targeting cacheable memory addresses (e.g., corresponding to the number of processing nodes), and where +1 indicates an additional bus for memory transactions targeting non-cacheable memory addresses.

Figure 7:
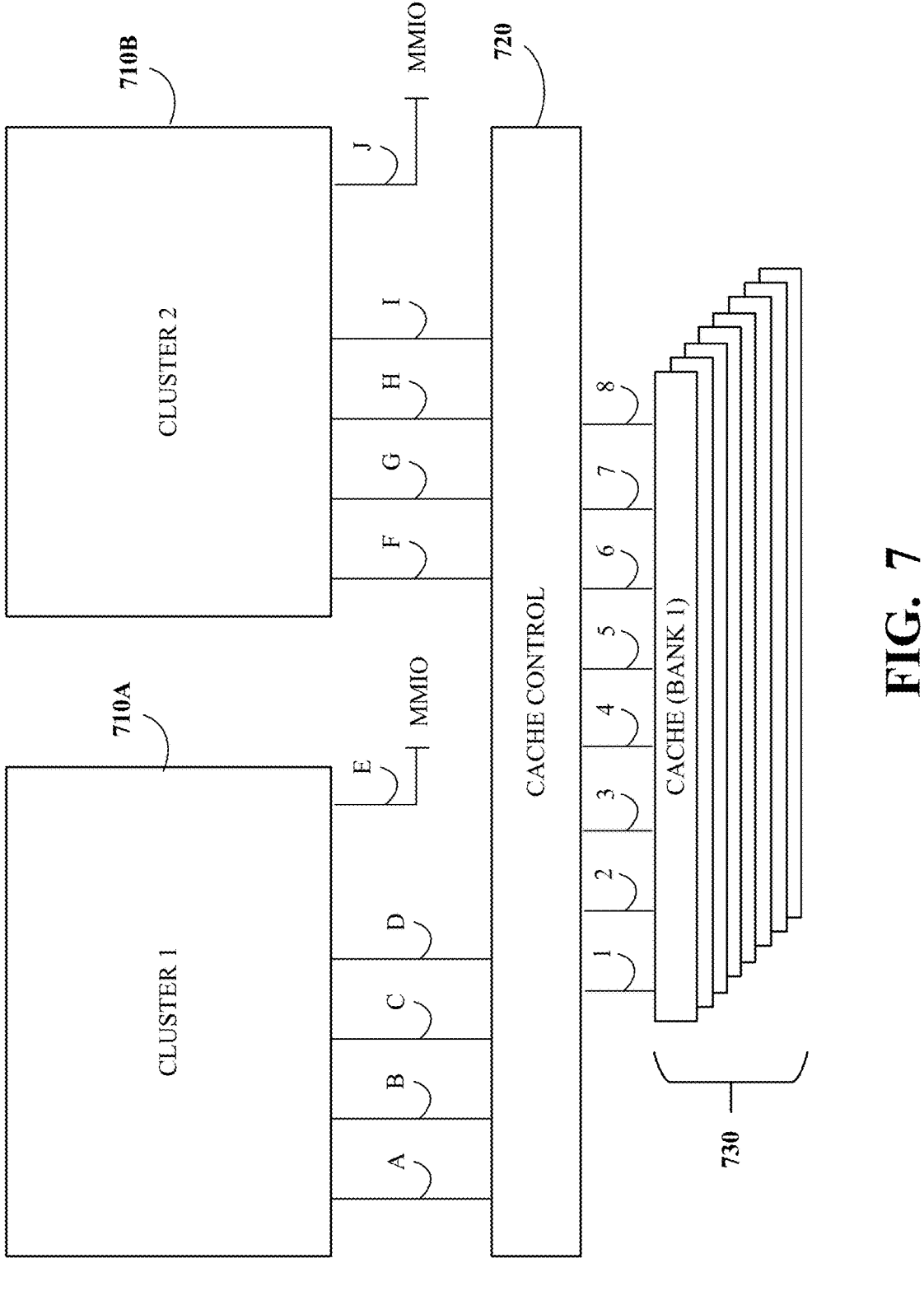
FIG. 7 is a block diagram of another example of an integrated circuit design with improved interconnect.

FIG. 7 is a block diagram of another example of an integrated circuit design 700 with improved interconnect. For example, the integrated circuit design 700 may be generated using at least part of the process 300 shown in FIG. 3. A system, such as the integrated circuit design service infrastructure 110 shown in FIG. 1, may access design parameters to configure the integrated circuit design 700. The integrated circuit design 700 may be configured to include multiple clusters, such as clusters 710A and 710B. For example, a cluster may implement four processing nodes and may provide four buses for memory transactions targeting cacheable memory addresses (e.g., including a transaction router that provides bank binding) and one bus for memory transactions targeting non-cacheable memory addresses. The clusters 710A and 710B may be like the cluster 610 shown in FIG. 6. The integrated circuit design 700 may also include cache control circuitry 720 that routes transactions to banks, and a cache 730 that is segmented into multiple banks (e.g., eight banks). In some implementations, the cache 730 may be an L3 cache shared by processing nodes of the clusters.

The cache control circuitry 720 may implement a system level (e.g., ASIC or SoC level) cross bar and associated circuitry. In some implementations, the cache control circuitry 720 may provide cache coherency among the processing nodes of the clusters. The cache control circuitry 720 may receive memory transactions targeting cacheable memory addresses from the clusters. The cache control circuitry 720 may receive the memory transactions via buses that steer to specific cache banks. For example, a transaction router in a cluster, like the second transaction router 670 shown in FIG. 6, may implement bank binding to steer memory transactions to buses associated with specific banks of the cache 730. The cache control circuitry 720 may route the memory transactions to the respective banks. For example, in one implementation, the cache control circuitry 720 may route: memory transactions on a first bus of cluster 710A (e.g., bus "A") and memory transactions on a first bus of cluster 710B (e.g., bus "F") to first and second banks of the cache 730 (e.g., "Bank 1" and "Bank 2"); memory transactions on a second bus of cluster 710A (e.g., bus "B") and memory transactions on a second bus of cluster 710B (e.g., bus "G") to third and fourth banks of the cache 730 (e.g., "Bank 3" and "Bank 4"); and so forth. This may permit memory transactions in parallel, via multiple bus interfaces, to different banks of the cache 730.

Accordingly, the transaction routers of the clusters may permit an improved physical design of the chip, such as by reducing wiring, shortening wiring, and/or providing a smaller footprint, while maintaining bandwidth. For example, in the integrated circuit design 700 with eight processing nodes (e.g., four processing nodes per cluster) and eight banks of cache, the transaction routers may reduce sixty-four possible buses (e.g., a bus between each processing node and each bank) to sixteen buses (e.g., a bus associating a processing node within one of two banks of cache, for eight processing nodes and eight banks of cache). This may result in an improved physical design of the chip, such as by reducing wiring, shortening wiring, and/or providing a smaller footprint, while maintaining bandwidth.

In a first aspect, the subject matter described in this specification can be embodied in a method that includes: accessing design parameters to configure an integrated circuit design and metadata associated with the integrated circuit design, wherein the integrated circuit design includes a transaction source to be included in an integrated circuit, wherein the transaction source is configured to transmit a plurality of memory transactions to memory addresses, and wherein the metadata indicates whether a memory transaction will target a non-cacheable memory address; and using the integrated circuit design and the metadata to generate a design output in which a memory transaction of the plurality of memory transactions that targets a non-cacheable memory address is routed to bypass a cache associated with the transaction source when the metadata indicates the memory transaction will target a non-cacheable memory address. In some implementations, the design output includes a transaction router, and the transaction router may be configured to route memory transactions transmitted by the transaction source. In some implementations, generating the design output comprises wiring the transaction source to permanently route memory transactions to bypass the cache. In some implementations, the non-cacheable memory address corresponds to a memory-mapped I/O address. In some implementations, the method may include generating the design output so that a memory transaction of the plurality of memory transactions which targets a cacheable memory address will be routed to the cache when the metadata indicates the memory transaction will target a cacheable memory address. In some implementations, generating the design output comprises wiring the transaction source to permanently route memory transactions to the cache. In some implementations, the cache is a private Level 2 (L2) cache associated with the transaction source. In some implementations, the transaction source is a processor core. In some implementations, the transaction source is a direct memory access (DMA) controller.

In a second aspect, the subject matter described in this specification can be embodied in a method that includes: propagating metadata associated with at least a first transaction source to be associated with at least a first address decoder, wherein the first address decoder is configured to be connected to a cache and the metadata indicates cacheability of at least one memory address associated with the first transaction source, and wherein an integrated circuit design includes a hardware construction language expression of the first transaction source, the first address decoder, and the cache; and compiling the integrated circuit design to produce a design output based on the metadata, wherein the design output includes an instance of the first address decoder configured to transmit memory transactions to circuitry that bypasses the cache for memory locations having the metadata indicating that such memory locations are not cacheable. In some implementations, the method may include wiring the first transaction source directly to the cache without wiring the first transaction source to the circuitry that bypasses the cache if the metadata indicates that the first transaction source only sends memory transactions to the cache. In some implementations, the method may include wiring the first transaction source directly to the circuitry that bypasses the cache without wiring the first transaction source to the cache if the metadata indicates that the first transaction source does not send memory transactions to the cache. In some implementations, the method may include reducing a memory size of the cache if the metadata indicates that the first transaction source is an only transaction source to send memory transactions to the cache.

In a third aspect, the subject matter described in this specification can be embodied in a method that includes: accessing design parameters to configure an integrated circuit design, wherein the integrated circuit design includes a plurality of processing nodes to be included in an integrated circuit, wherein a processing node is configured to transmit a plurality of memory transactions to memory addresses; and compiling the integrated circuit design to generate a design output including a first transaction router and a second transaction router, wherein the first transaction router receives memory transactions from the plurality of processing nodes and determines whether a memory transaction is targeting a cacheable memory address, and wherein the second transaction router receives memory transactions targeting cacheable memory addresses from the first transaction router and routes memory transactions through a bus interface associated with cache addresses. In some implementations, the second transaction router determines a bus interface associated with a bank of a cache. In some implementations, the second transaction router determines the bus interface by performing a hash calculation to associate a memory transaction targeting a cacheable memory address with the bank. In some implementations, the cache is a Level 3 (L3) cache shared by the processing nodes, and wherein a processing node comprises a processor core and a private L2 cache associated with the processor core. In some implementations, the design output may include a third transaction router that receives memory transactions targeting non-cacheable memory addresses from the first transaction router and routes memory transactions through a bus interface associated with memory-mapped I/O addresses. In some implementations, the bus interface is one of a plurality of bus interfaces for routing memory transactions targeting cacheable memory addresses, and the design output includes one bus interface for routing memory transactions targeting non-cacheable memory addresses.

In a fourth aspect, the subject matter described in this specification can be embodied in a system that includes: a plurality of processing nodes implemented in an integrated circuit, wherein a processing node transmits a plurality of memory transactions to memory addresses; a first transaction router in communication with the plurality of processing nodes, the first transaction router receiving memory transactions from the plurality of processing nodes, wherein the first transaction router determines whether a memory transaction is targeting a cacheable memory address; and a second transaction router in communication with the first transaction router, the second transaction router receiving memory transactions targeting cacheable memory addresses from the first transaction router, wherein the second transaction router routes memory transactions through a bus interface associated with cache addresses. In some implementations, the second transaction router determines a bus interface associated with a bank of a cache. In some implementations, the second transaction router determines the bus interface by performing a hash calculation to associate a memory transaction targeting a cacheable memory address with the bank of the cache. In some implementations, the cache is a Level 3 (L3) cache, and a processing node may comprise a processor core and a private L2 cache associated with the processor core. In some implementations, the method may include a third transaction router in communication with the first transaction router, the third transaction router receiving memory transactions targeting non-cacheable memory addresses from the first transaction router, wherein the third transaction router routes memory transactions through a bus interface associated with memory-mapped I/O addresses. In some implementations, the bus interface is one of a plurality of bus interfaces for routing memory transactions targeting cacheable memory addresses, and the system includes one bus interface for routing memory transactions targeting non-cacheable memory addresses.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent arrangements.

What is claimed is:

1. A method comprising:
accessing design parameters to configure an integrated circuit design and metadata associated with the integrated circuit design, wherein the integrated circuit design includes a transaction source, and wherein the metadata indicates that a transaction from the transaction source targets a non-cacheable memory address;
generating a data structure for the integrated circuit design, the data structure including a reference to the metadata; and
generating, based on the reference to the metadata in the data structure, a design output including a transaction router configured to route memory transactions from the transaction source, wherein the transaction router is configured by the metadata such that the transaction from the transaction source is routed to bypass a cache along a non-cache path, and wherein the transaction router is further configured to route transactions targeting cacheable memory addresses to the cache along a separate cache path.

2. The method of claim 1, wherein generating the design output comprises wiring the transaction source to permanently route memory transactions to bypass the cache.

3. The method of claim 1, wherein the non-cacheable memory address corresponds to a memory-mapped I/O address.

4. The method of claim 1, wherein the design output is generated such that a memory transaction which targets a cacheable memory address will be routed to the cache when the metadata indicates the memory transaction will target a cacheable memory address.

5. The method of claim 1, wherein generating the design output comprises wiring the transaction source to permanently route memory transactions to the cache.

6. The method of claim 1, wherein the cache is a private Level 2 (L2) cache associated with the transaction source.

7. The method of claim 1, wherein the transaction source is a processor core.

8. The method claim 1, wherein the transaction source is a direct memory access (DMA) controller.

9. A method comprising:
propagating metadata associated with at least a first transaction source to be associated with at least a first address decoder, wherein the first address decoder is configured to be connected to a cache and the metadata indicates cacheability of at least one memory address associated with the first transaction source, and wherein an integrated circuit design includes a hardware construction language expression of the first transaction source, the first address decoder, and the cache; and compiling the integrated circuit design to produce a design output based on the metadata, wherein the design output includes an instance of the first address decoder configured to transmit memory transactions to circuitry that bypasses the cache for memory locations having the metadata indicating that such memory locations are not cacheable, and wherein the first address decoder is further configured to transmit memory transactions to the cache along a separate cache path for memory locations having metadata indicating that such memory locations are cacheable.

10. The method of claim 9, further comprising wiring the first transaction source directly to the cache without wiring the first transaction source to the circuitry that bypasses the cache in response to determining that the metadata indicates that the first transaction source only sends memory transactions to the cache.

11. The method of claim 9, further comprising wiring the first transaction source directly to the circuitry that bypasses the cache without wiring the first transaction source to the cache in response to determining that the metadata indicates that the first transaction source does not send memory transactions to the cache.

12. The method of claim 9, further comprising reducing a memory size of the cache in response to determining that the metadata indicates that the first transaction source is an only transaction source to send memory transactions to the cache.

13. A method comprising:

accessing design parameters to configure an integrated circuit design, wherein the integrated circuit design includes a plurality of processing nodes to be included in an integrated circuit, wherein a processing node is configured to transmit a plurality of memory transactions to memory addresses; and compiling the integrated circuit design to generate a design output including a first transaction router and a second transaction router, wherein the first transaction router receives memory transactions from the plurality of processing nodes and determines whether a memory transaction is targeting a cacheable memory address, separates the memory transactions based on whether a memory transaction targets a cacheable memory address or a non-cacheable memory address, and routes memory transactions targeting the non-cacheable memory address to a non-cache path, and wherein the second transaction router receives memory transactions targeting cacheable memory addresses from the first transaction router and routes the memory transactions targeting cacheable memory addresses through a bus interface associated with cache addresses.

14. The method of claim 13, wherein the second transaction router determines a bus interface associated with a bank of a cache.

15. The method of claim 14, wherein the second transaction router determines the bus interface by performing a hash calculation to associate a memory transaction targeting a cacheable memory address with the bank.

16. The method of claim 14, wherein the cache is a Level 3 (L3) cache shared by the processing nodes, and wherein a processing node comprises a processor core and a private L2 cache associated with the processor core.

17. The method of claim 13, wherein the design output includes a third transaction router that receives memory transactions targeting non-cacheable memory addresses from the first transaction router and routes memory transactions through a bus interface associated with memory-mapped I/O addresses.

18. The method of claim 13, wherein the bus interface is one of a plurality of bus interfaces for routing memory transactions targeting cacheable memory addresses, and wherein the design output includes one bus interface for routing memory transactions targeting non-cacheable memory addresses.

19. The method of claim 13, wherein the second transaction router implements bank binding to route memory transactions to specific banks of a cache.

* * * * *